United States Patent
Sorkine Hornung et al.

(10) Patent No.: US 11,315,329 B1
(45) Date of Patent: Apr. 26, 2022

(54) SCENE RECONSTRUCTION FROM SPARSE DATA

(71) Applicant: Facebook Technologies, LLC, Menlo Park, CA (US)

(72) Inventors: Alexander Sorkine Hornung, Zurich (CH); Alessia Marra, Zurich (CH); Fabian Langguth, Zurich (CH); Matthew James Alderman, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/801,016

(22) Filed: Feb. 25, 2020

(51) Int. Cl.
*G06T 15/00* (2011.01)
*G06T 19/00* (2011.01)

(52) U.S. Cl.
CPC ........ *G06T 19/006* (2013.01); *G06T 2210/12* (2013.01)

(58) Field of Classification Search
CPC ......... G06T 17/20; G06T 7/55; G06T 15/005; G06T 2200/04; G06T 2200/08; G06K 9/00791; G06K 9/3233; G06K 9/4642; G06K 9/6267
See application file for complete search history.

(56) References Cited

U.S. PATENT DOCUMENTS

| | | | |
|---|---|---|---|
| 6,996,505 B1 * | 2/2006 | Edelsbrunner | G06T 17/20 345/419 |
| 8,824,781 B2 * | 9/2014 | Litvak | G06F 3/0304 382/154 |
| 9,633,483 B1 * | 4/2017 | Xu | G06T 17/10 |
| 9,678,963 B2 * | 6/2017 | Hernandez Londono | G06F 16/13 |
| 9,734,595 B2 * | 8/2017 | Lukac | G06T 9/00 |
| 9,922,443 B2 * | 3/2018 | Ceylan | G06T 17/00 |
| 10,026,017 B2 * | 7/2018 | Luo | G06K 9/624 |
| 10,049,492 B2 * | 8/2018 | Babahajiani | G06T 17/20 |
| 10,198,858 B2 * | 2/2019 | Singh | G06T 17/20 |
| 10,444,759 B2 * | 10/2019 | Douillard | G06T 17/05 |
| 10,769,848 B1 * | 9/2020 | Wang | G06T 15/005 |
| 10,832,471 B2 * | 11/2020 | Feng | G06T 17/20 |
| 10,853,974 B2 * | 12/2020 | Budagavi | G06T 9/001 |
| 10,861,246 B2 * | 12/2020 | Voth | G06T 17/00 |
| 2020/0342233 A1 * | 10/2020 | Chang | H04N 21/2187 |

(Continued)

OTHER PUBLICATIONS

Guo Y, Wang H, Hu Q, Liu H, Liu L, Bennamoun M. Deep Learning for 3D Point Clouds: A Survey. arXiv. Dec. 2019:arXiv-1912.*

(Continued)

*Primary Examiner* — Phu K Nguyen
(74) *Attorney, Agent, or Firm* — Baker Botts L.L.P.

(57) ABSTRACT

In one embodiment, a method includes accessing a plurality of points, wherein each point (1) corresponds to a spatial location associated with an observed feature of a physical environment and (2) is associated with a patch representing the observed feature, determining a density associated with each of the plurality of points based on the spatial locations of the plurality of points, scaling the patch associated with each of the plurality of points based on the density associated with the point, and reconstructing a scene of the physical environment based on at least the scaled patches.

20 Claims, 18 Drawing Sheets
(7 of 18 Drawing Sheet(s) Filed in Color)

(56) References Cited

U.S. PATENT DOCUMENTS

2021/0089780 A1* 3/2021 Chang .............. H04N 21/23418

OTHER PUBLICATIONS

Hu SM, Cai JX, Lai YK. Semantic labeling and instance segmentation of 3D point clouds using patch context analysis and multiscale processing. IEEE transactions on visualization and computer graphics. Dec. 27, 2018.*
Zhang SH, Lai YK. Geometric and Semantic Modeling from RGB-D Data. InRGB-D Image Analysis and Processing 2019 (pp. 267-282). Springer, Cham.*
Al Hakim, E. (2018). 3d yolo: End-to-end 3d object detection using point clouds.*
Ochmann S, Vock R, Wessel R, Klein R. Automatic reconstruction of parametric building models from indoor point clouds. Computers & Graphics. Feb. 1, 2016,54:94-103.*
Bassier M, Vergauwen M. Clustering of Wall Geometry from Unstructured Point Clouds Using Conditional Random Fields. Remote Sensing. Jan. 2019;11(13):1586.*
Ester M, Kriegel HP, Sander J, Xu X. A density-based algorithm for discovering clusters in large spatial databases with noise. InKdd Aug. 2, 1996 (vol. 96, No. 34, pp. 226-231).*
Poliyapram V, Wang W, Nakamura R. A point-wise lidar and image multimodal fusion network (PMNet) for aerial point cloud 3D semantic segmentation. Remote Sensing. Jan. 2019;11(24):2961.*
Ponciano JJ, Roetner M, Reiterer A, Boochs F. Object Semantic Segmentation in Point Clouds—Comparison of a Deep Learning and a Knowledge-Based Method. ISPRS International Journal of Geo-Information. Apr. 2021;10(4):256.*

* cited by examiner

SCENE RECONSTRUCTION FROM SPARSE DATA

TECHNICAL FIELD

This disclosure generally relates to virtual reality and augmented reality.

BACKGROUND

Virtual reality (VR) is an experience taking place within a computer-generated reality of immersive environments can be similar to or completely different from the real world. Applications of virtual reality can include entertainment (i.e. gaming) and educational purposes (i.e. medical or military training). Other distinct types of VR style technology include augmented-reality and mixed reality. Currently standard virtual reality systems use either virtual reality headsets or multi-projected environments to generate realistic images, sounds and other sensations that simulate a user's physical presence in a virtual environment. Virtual reality typically incorporates auditory and video feedback but may also allow other types of sensory and force feedback through haptic technology.

Augmented reality (AR) is an interactive experience of a real-world environment where the objects that reside in the real-world are enhanced by computer-generated perceptual information, sometimes across multiple sensory modalities, including visual, auditory, haptic, somatosensory, and olfactory. The overlaid sensory information can be constructive (i.e. additive to the natural environment) or destructive (i.e., masking of the natural environment) and is seamlessly interwoven with the physical world such that it is perceived as an immersive aspect of the real environment. Augmented-reality is used to enhance natural environments or situations and offer perceptually enriched experiences. With the help of advanced AR technologies (e.g. adding computer vision and object recognition) the information about the surrounding real world of the user becomes interactive and digitally manipulatable.

SUMMARY OF PARTICULAR EMBODIMENTS

In particular embodiments, a computing system may reconstruct a scene based on sparse data which may be partially incomplete or inconsistent. The sparse data may be collected by sensors, e.g., cameras of an AR/VR headset. However, sensors may only observe limited part of the scene that is visible from a user's vantage point. Additionally, sensors may be unable to capture the depth information with respect to black and white objects, e.g., a white wall. A three-dimensional (3D) model reconstructed from such data may appear arbitrarily incomplete and fragmented, breaking the feeling of visual immersion and hence compromising user experiences that involve sharing of real-world environments between multiple remote users. To address the aforementioned issue, the computing system may apply parametric reconstruction techniques to the sparse data to generate appropriately designed visual representations. Specifically, the computing system may generate a point cluster of patches in a three-dimensional space and then reconstruct the scene from these various patches. The reconstruction may be completed in real time, using only sensors on the user's AR/VR headset, and without imposing an explicit scanning procedure. As a result, the computing system may enable immersive shared user experience based on the reconstructed scene. The embodiments disclosed herein may have a technical advantage of avoiding view-dependent generation of geometry but requiring only static geometry. Although this disclosure describes reconstructing particular scene by particular systems in a particular manner, this disclosure contemplates reconstructing any suitable scene by any suitable system in any suitable manner.

In particular embodiments, the computing system may access a plurality of points. Each point may (1) correspond to a spatial location associated with an observed feature of a physical environment and (2) be associated with a patch representing the observed feature. In particular embodiments, the computing system may then determine, based on the spatial locations of the plurality of points, a density associated with each of the plurality of points. The computing system may then scale the patch associated with each of the plurality of points based on the density associated with the point. In particular embodiments, the computing system may further reconstruct a scene of the physical environment based on at least the scaled patches.

Embodiments of the invention may include or be implemented in conjunction with an artificial reality system. Artificial reality is a form of reality that has been adjusted in some manner before presentation to a user, which may include, e.g., a virtual reality (VR), an augmented-reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1O illustrates an example fading of free space bounds on the floor.

DESCRIPTION OF EXAMPLE EMBODIMENTS

In particular embodiments, a computing system may reconstruct a scene based on sparse data which may be partially incomplete or inconsistent. The sparse data may be collected by sensors, e.g., cameras of an AR/VR headset. However, sensors may only observe limited part of the scene that is visible from a user's vantage point. Additionally, sensors may be unable to capture the depth information with respect to black and white objects, e.g., a white wall. A three-dimensional (3D) model reconstructed from such data may appear arbitrarily incomplete and fragmented, breaking the feeling of visual immersion and hence compromising user experiences that involve sharing of real-world environments between multiple remote users. To address the aforementioned issue, the computing system may apply parametric reconstruction techniques to the sparse data to generate appropriately designed visual representations. Specifically, the computing system may generate a point cluster of patches in a three-dimensional space and then reconstruct the scene from these various patches. The reconstruction may be completed in real time, using only sensors on the user's AR/VR headset, and without imposing an explicit scanning procedure. As a result, the computing system may enable immersive shared user experience based on the reconstructed scene. The embodiments disclosed herein may have a technical advantage of avoiding view-dependent generation of geometry but requiring only static geometry. Although this disclosure describes reconstructing particular scene by particular systems in a particular manner, this disclosure contemplates reconstructing any suitable scene by any suitable system in any suitable manner.

In particular embodiments, the computing system may access a plurality of points. Each point may (1) correspond to a spatial location associated with an observed feature of a physical environment and (2) be associated with a patch representing the observed feature. In particular embodiments, the computing system may then determine, based on the spatial locations of the plurality of points, a density associated with each of the plurality of points. The computing system may then scale the patch associated with each of the plurality of points based on the density associated with the point. In particular embodiments, the computing system may further reconstruct a scene of the physical environment based on at least the scaled patches.

Figure 1A:
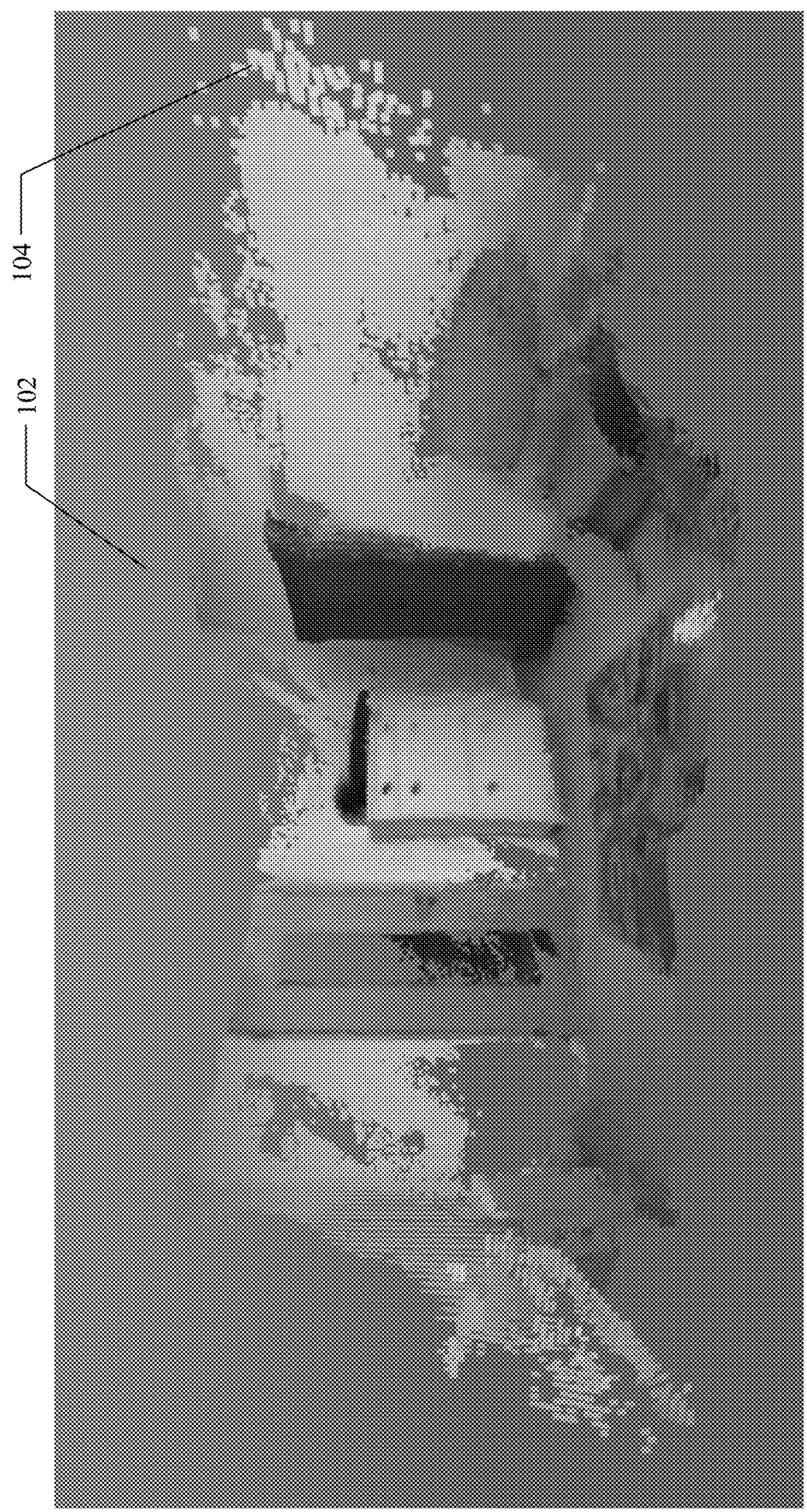
FIG. 1A illustrates an example visualization of the sparse sensor data corresponding to the plurality of data points.

FIGS. 1A-1O illustrates an example process of scene reconstruction from sparse sensor data. FIG. 1A illustrates an example visualization of the sparse sensor data corresponding to the plurality of data points. The visualization corresponds to a living room. In particular embodiments, the sparse sensor data may be caused by different issues. As an example and not by way of limitation, when a user views his/her living room via an AR/VR headset, some area may be occluded, which may cause the sparse sensor data. As another example and not by way of limitation, the user may not want to go through a through scan of his/her living room using the AR/VR headset, which may also cause the sparse sensor data. In particular embodiments, the plurality of data points may be collected by one or more sensors of a client device, e.g., an AR/VR headset. As an example and not by way of limitation, a sensor may be a camera. In particular embodiments, the plurality of points may be generated based on one or more of an image or a video collected by the sensors of the client device. The generation may comprise applying one or more aggregation algorithms to the one or more images or videos. Using aggregation algorithms may have an advantage that only limited number of images are required for effect scene reconstruction. As an example and not by way of limitation, only two black and white images may be required to reconstruct the scene by the embodiments disclosed herein. In particular embodiments, the computing system may further determine, based on the plurality of points, a gradient background 102 associated with the physical environment. Although this disclosure describes particular sparse data in a particular manner, this disclosure contemplates any suitable sparse data in any suitable manner.

In particular embodiments, the computing system may generate a point cluster based on the plurality of data points. The point cluster may be in a three-dimensional (3D) space. In particular embodiments, the distance between any two data points in the point cluster may be known. In particular embodiments, the computing system may further convert the plurality of data points to the plurality of patches, respectively. Each patch may be generated based on geometric approximation of the corresponding point. In particular embodiments, a patch may be not limited to a 2D quad. A patch may have any 2D shape (e.g., a circle) or 3D model (e.g., a cube). As illustrated in FIG. 1A, because of the sparsity of the sensor data, there may be many patches in the scene without associated color information. In particular embodiments, each of the plurality of patches may be associated with one or more of a spatial location, a normal, or a data color. In particular embodiments, a normal may indicate the orientation of the patch. For the point cluster, the center may have a data color which is gray scale. In particular embodiments, there may be two ways to compute the normal for a patch. The first way may be as follows. The computing system may determine the normal based on a depth map associated with the patch. The second way may be determining the normal based on the following steps. The computing system may first identify one or more areas of the patch. Each identified area may be associated with a surface direction. In particular embodiments, the computing system may then aggregate the surface directions associated with the one or more areas. The computing system may further determine the normal of the patch based on the aggregated surface directions. In particular embodiments, the surface direction of each patch may be later used for hallucinating more content associated with the point cluster or for relighting the scene to be reconstructed. Although this disclosure describes particular patches in particular point clusters in a particular manner, this disclosure contemplates any suitable patch in any suitable point cluster in any suitable manner.

In particular embodiments, the computing system may calculate the density for different regions within the point cluster once the point cluster is generated. The density information may be stored associated with each data point in the point cluster. When the density of a region is high, a probabilistic model may have a higher confidence in reconstructing a scene based on this region than when the density is low. In particular embodiments, the computing system may calculate a density for each data point by determining a threshold diameter and determining how many data points exist within the region based on such threshold diameter. Although this disclosure describes calculating particular density by particular systems in a particular manner, this disclosure contemplates calculating any suitable density by any suitable system in any suitable manner.

Figure 1B:
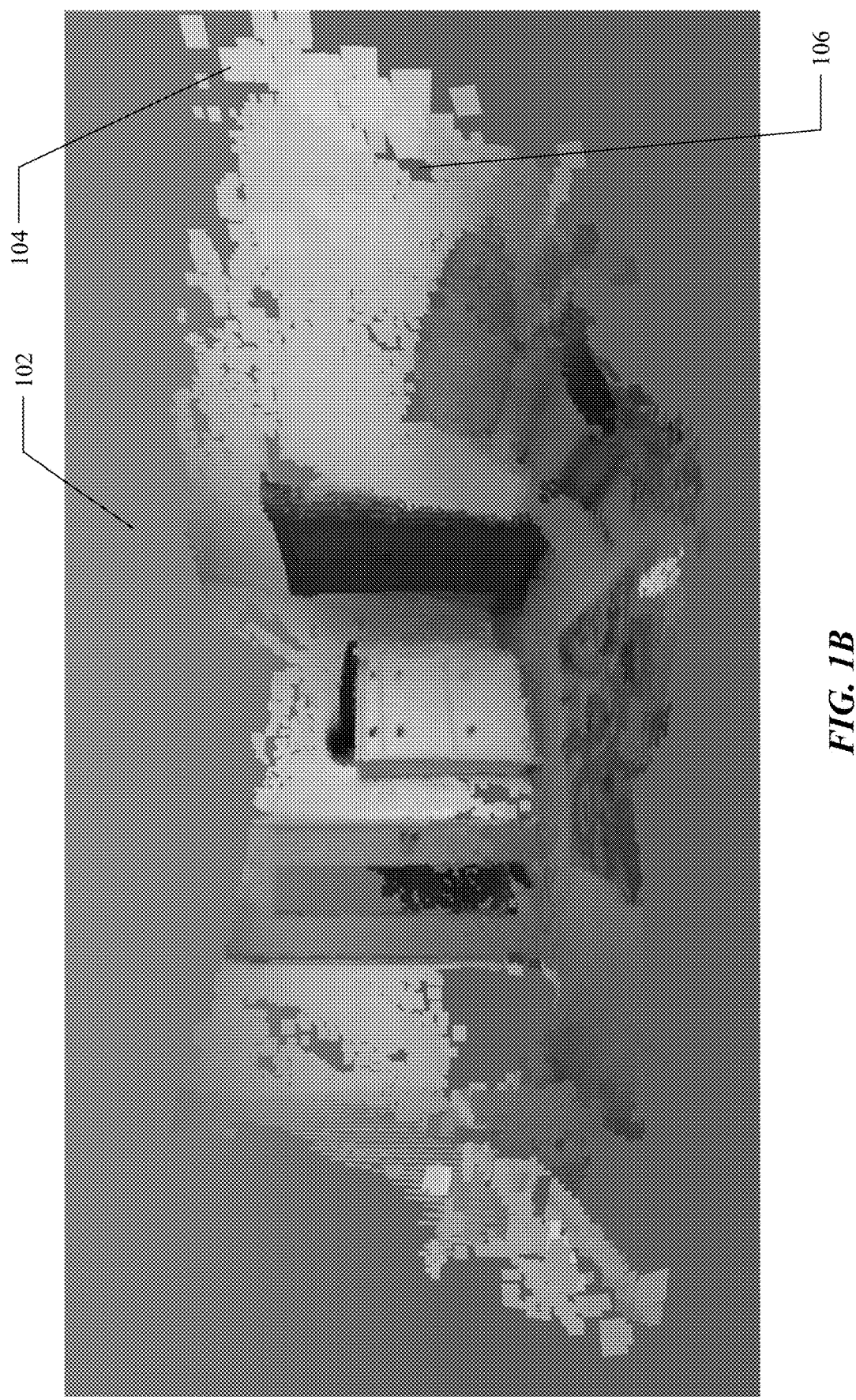
FIG. 1B illustrates an example scaling of patches based on density.

FIG. 1B illustrates an example scaling of patches based on density. In particular embodiments, the computing system may apply the density as a multiplier to scale each corresponding patch. The purpose of the scaling may be to make these patches bigger to expand their corresponding regions to fill some gaps caused by the sparse sensor data. The aforementioned process may be considered as extrapolation in which the computing system hallucinates how the structures of the point cluster could be expanded. As an example and not by way of limitation, the patches 104 may be scaled as indicated in FIG. 1B. In particular embodiments, the computing system may determine, based on one or more of the scaled patches, an expanded region. The computing system may then calculate a confidence score for the expanded region based on a probabilistic model. In particular embodiments, the computing system may then determine the calculated confidence score is below a threshold value. This may be because the expanded region is a made-up region. To deal with the low confidence score, the computing system may further send, to a client device associated with the physical environment, instructions for requesting a user associated with the client device to visually scan a portion of the physical environment corresponding to the expanded region. In particular embodiments, reconstructing the scene may be further based on the scan of the portion of the physical environment. Although this disclosure describes scaling particular patches by particular systems in a particular manner, this disclosure contemplates scaling any suitable patch by any suitable system in any suitable manner.

Figure 1C:
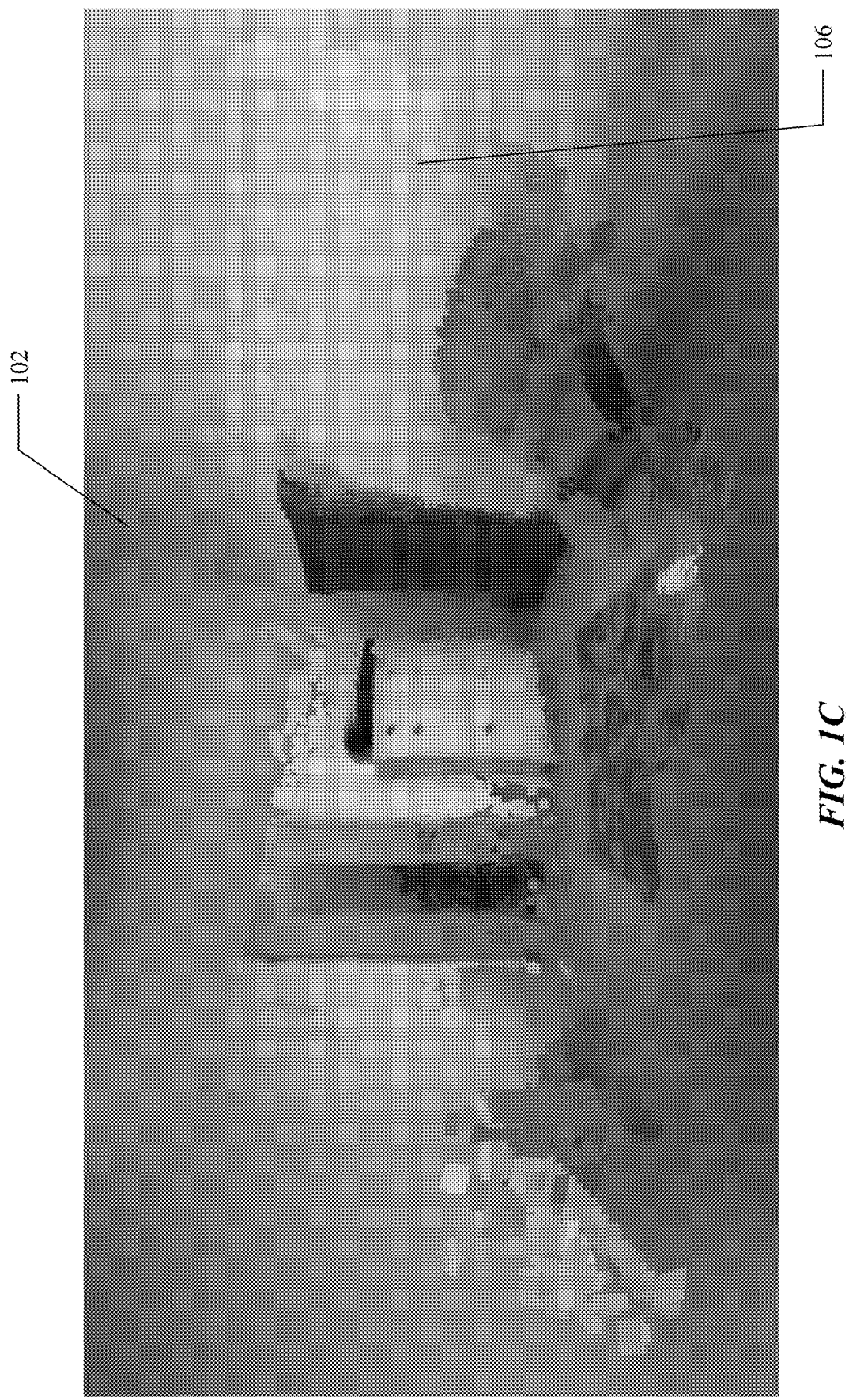
FIG. 1C illustrates an example color blurring based on a bounding box.

FIG. 1C illustrates an example color blurring based on a bounding box. In particular embodiments, the computing system may generate, based on the plurality of scaled patches, a bounding box. In particular embodiments, generating the bounding box may be further based on a geometry shader. The geometry shader may perform sampling and tribulations to generate the bounding box. In particular embodiments, the computing system may further add a blurred data color to each of the plurality of uncolored cubes based on a data color of a proximate scaled patch. The uncolored cube and the proximate scaled patch may have a proximity below a threshold value. In particular embodiments, the geometry shader may determine what colors to blur it with. As an example and not by way of limitation, a bounding box may comprise a dark cube (i.e., no color) if there is not enough data corresponding to the cube. Accordingly, the computing system may take the data colors of patches around the cube and blur them onto it. As an example and not by way of limitation, the patches 106 in FIG. 1B may be blurred with data colors as demonstrated in FIG. 1C. Blurring data colors based on the bounding box may result a technical advantage of creating the illusion of an immersive physical space even when the reconstruction is incomplete for major surfaces such as walls, floor, and ceiling. In particular embodiments, reconstructing the scene of the physical environment may be further based on the bounding box and the blurred data colors corresponding to the plurality of uncolored cubes. Although this disclosure describes blurring particular colors by particular systems in a particular manner, this disclosure contemplates blurring any suitable color by any suitable system in any suitable manner.

In particular embodiments, the computing system may identify one or more boundaries associated with the bounding box. The identification may be based on one or more of a viewing direction associated with the physical environment, a reduction of a geometry associated with the plurality of points, or an extrapolation of the geometry associated with the plurality of points. The boundaries identified in the aforementioned ways may preserve thin features in the reconstruction such as a bottle on the table. In particular embodiments, thinning of partially reconstructed surfaces at their boundaries may have a technical advantage of communicating incomplete/uncertain information to a user and looking purposeful rather than incomplete. Although this disclosure describes identifying particular boundaries by particular systems in a particular manner, this disclosure contemplates identifying any suitable boundary by any suitable system in any suitable manner.

Figure 1D:
FIG. 1D illustrates an example blending of background colors in the data boundaries.
Figure 1E:
FIG. 1E illustrates an example adding of random patches in the background.
Figure 1F:
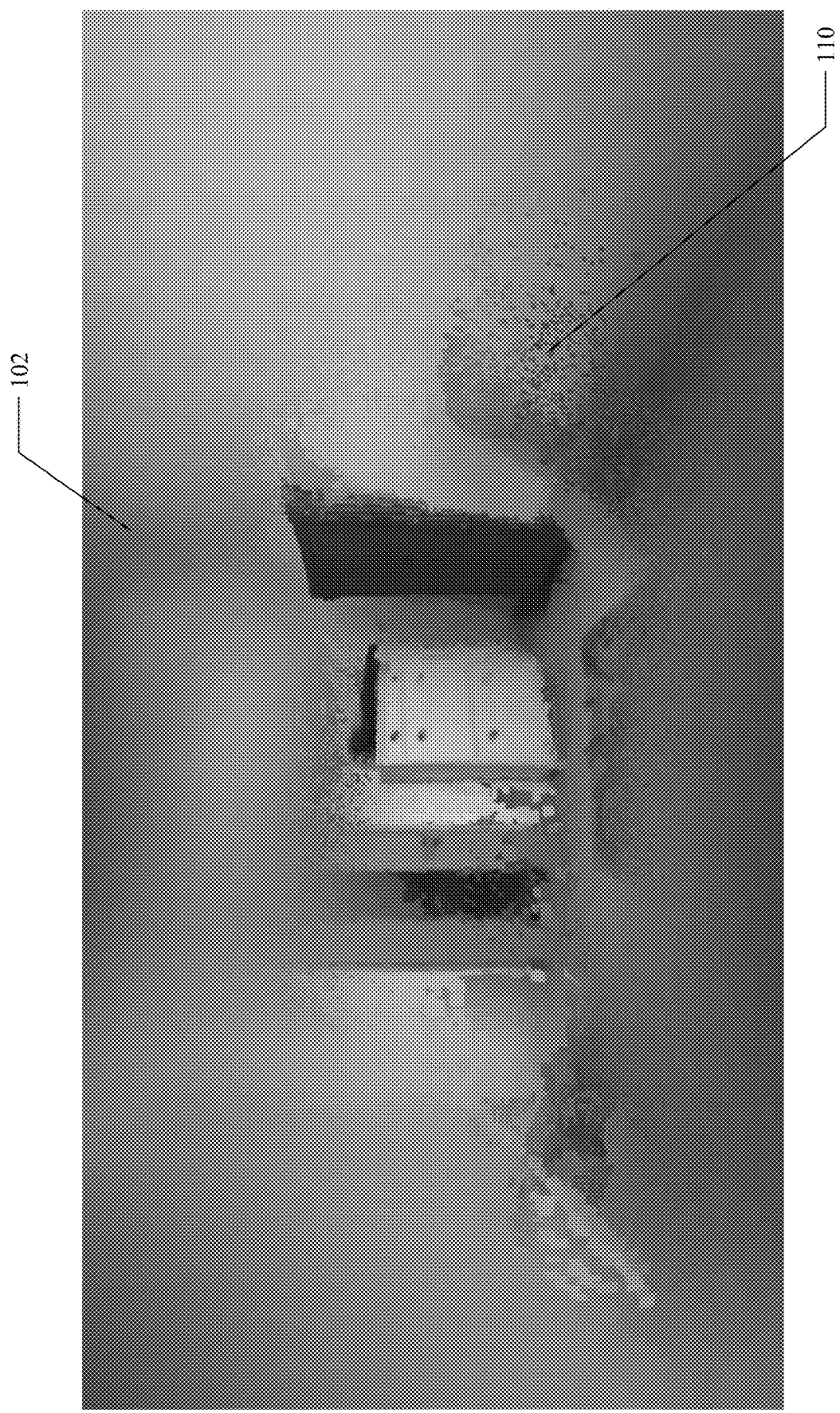
FIG. 1F illustrates an example fading of boundaries.
Figure 1G:
FIG. 1G illustrates an example random decimation of boundary patches.
Figure 1H:
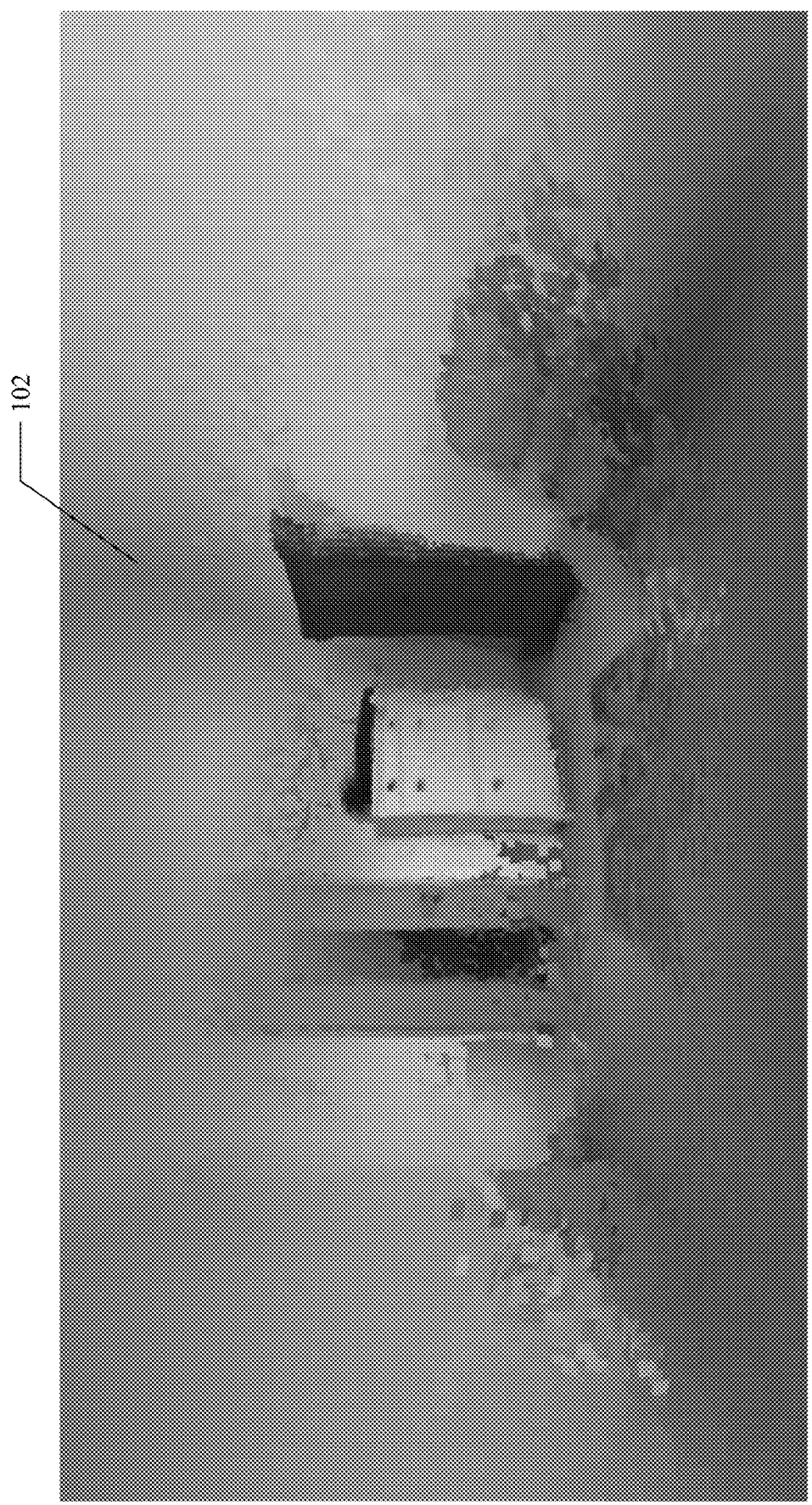
FIG. 1H illustrates an example extension of boundaries.

FIG. 1D illustrates an example blending of background colors in the data boundaries. In particular embodiments, the computing system may determine one or more background colors associated with the bounding box. The computing system may further blend the one or more background colors with the one or more boundaries. As a result, it may feel like that the sparse sensor data is fading into the background. FIG. 1E illustrates an example adding of random patches in the background. In particular embodiments, the computing system may add one or more patches at random locations in the gradient background. Each of the added patches may be of a random size. In particular embodiments, each of the added patches may be based on any visual style or any kind of shape. The goal of adding random patches may be to create noise and reduce perceived inconsistency of the sparse sensor data. As an example and not by way of limitation, there may be some random patches 108 randomly added in the gradient background. FIG. 1F illustrates an example fading of boundaries. In particular embodiments, the computing system may fade the boundaries by size. As an example and not by way of limitation, the area 110 may be resulted from the fading of boundaries. FIG. 1G illustrates an example random decimation of boundary patches. In particular embodiments, the computing system may identify, for each boundary, one or more patches associated with the boundary. The computing system may further randomly decimate the one or more patches with a gradient for each boundary. FIG. 1H illustrates an example extension of boundaries. In particular embodiments, the computing system may extend the boundaries of the bounding box. Although this disclosure describes processing particular boundaries by particular systems in a particular manner, this disclosure contemplates processing any suitable boundary by any suitable system in any suitable manner.

Figure 1I:
FIG. 1I illustrates an example gradient mapping to make the sparse sensor data feel more alive.
Figure 1J:
FIG. 1J illustrates an example gradient mapping to convey different moods/time of the day.
Figure 1K:
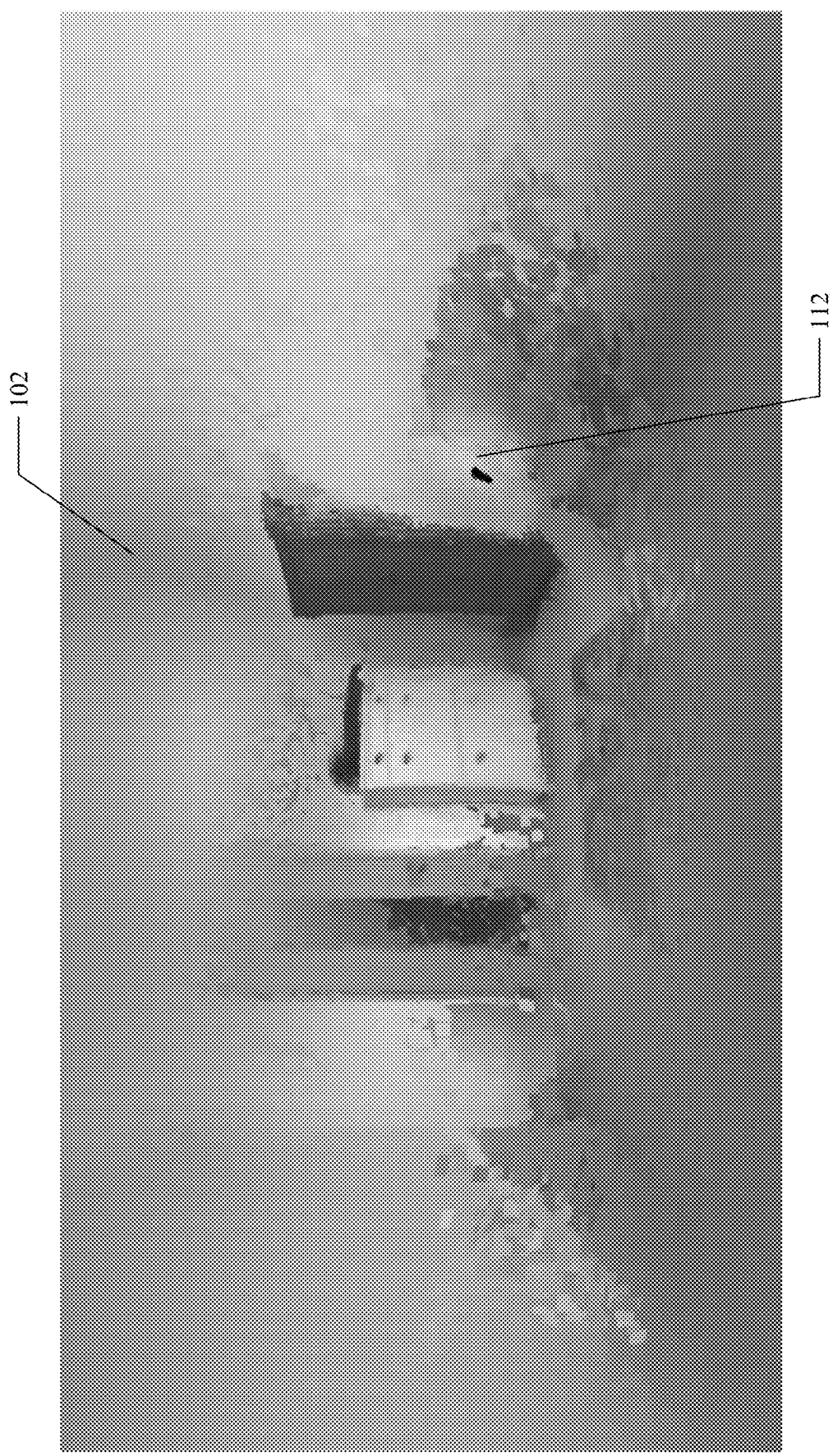
FIG. 1K illustrates an example color ramp for data interaction effect.
Figure 1L:
FIG. 1L illustrates an example color ramp for pin light effect.
Figure 1M:
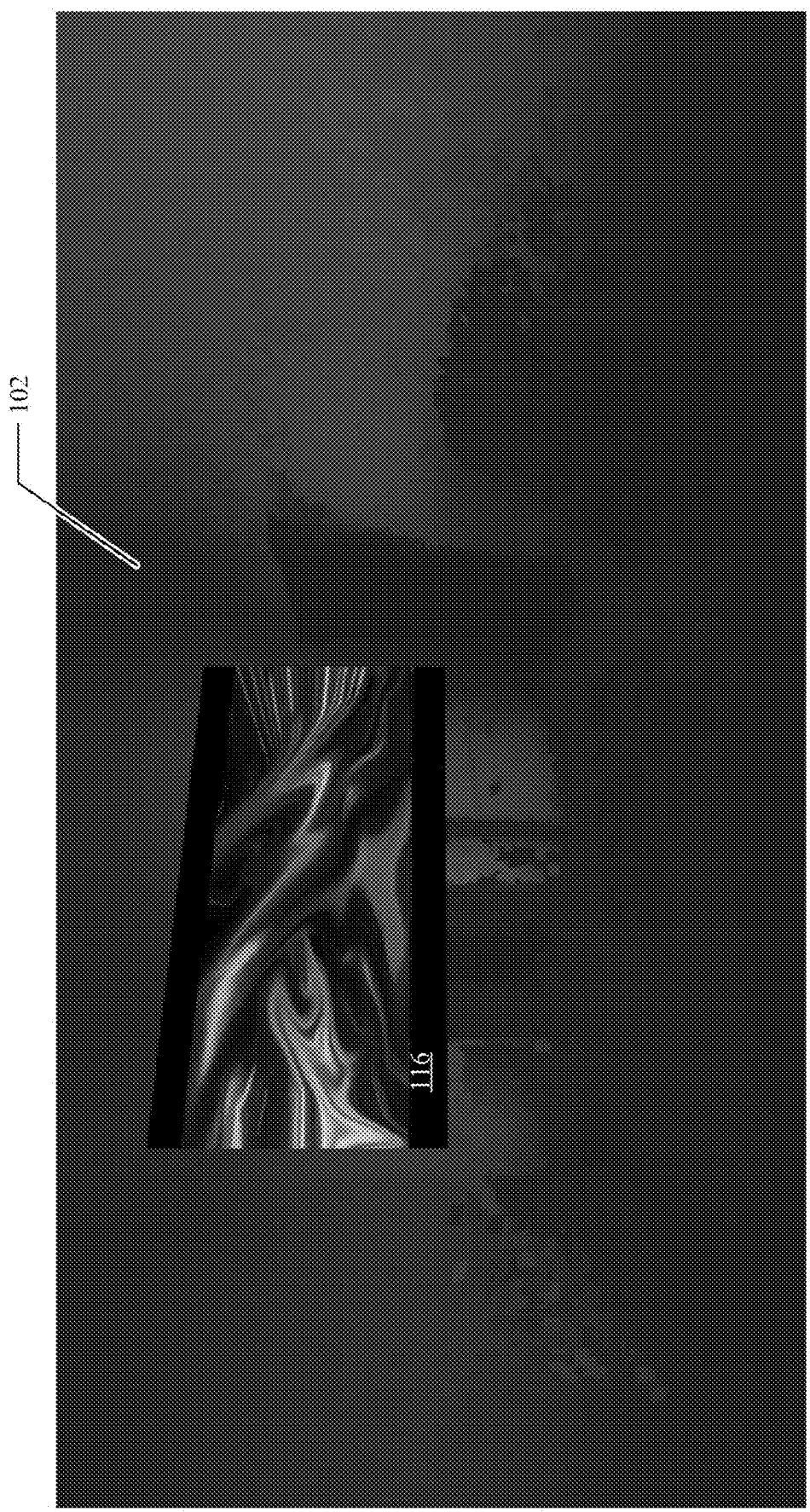
FIG. 1M illustrates example gradient mapping based on a video average colors.

In particular embodiments, the computing system may perform one or more colorization tests. In particular embodiments, the computing system may apply gradient mapping to the bounding box and the one or more boundaries. Using gradient mapping may make the sparse sensor data feel more alive and convey different moods/time of the day. FIG. 1I illustrates an example gradient mapping to make the sparse sensor data feel more alive. FIG. 1J illustrates an example gradient mapping to convey different moods/time of the day. In particular embodiments, the computing system may generate, for each of the boundaries, a color ramp and apply patch animation to one or more patches associated with each of the boundaries. Generating the color ramp may be based on the distance from the boundary to a client device, e.g., the controller of an AR/VR headset. Combining color ramp with patch animation may enhance the data interaction effect and pin light effect. FIG. 1K illustrates an example color ramp 112 for data interaction effect. FIG. 1L illustrates an example color ramp 114 for pin light effect. The color ramp 114 in FIG. 1L may be generated based on the distance with respect to the controller of the AR/VR headset. In particular embodiments, the gradient mapping may be based on a video average colors to augment a television screen with images projected onto the wall and surrounding objects. FIG. 1M illustrates example gradient mapping based on a video average colors. As illustrated in FIG. 1M, the gradient mapping may augment the physical environment surrounding a television screen 116 to enhance interactive experiences. Although this disclosure describes performing particular color tests by particular systems in a particular manner, this disclosure contemplates performing any suitable color test by any suitable system in any suitable manner.

Figure 1N:
FIG. 1N illustrates an example fading of patches based on the obstacle distance.
Figure 10:

In particular embodiments, the computing system may generate navigation overlay. As an example and not by way of limitation, the computing system may fade patches based on the obstacle distance from a reconstructed obstacle to a client device, e.g., the controller of an AR/VR headset. FIG. 1N illustrates an example fading of patches 118 based on the obstacle distance. As another example and not by way of limitation, the computing system may fade free space boundaries on the floor based on the position of AR/VR headset. FIG. 1O illustrates an example fading of free space bounds on the floor 120. Although this disclosure describes generating particular navigation overlay by particular systems in a particular manner, this disclosure contemplates generating any suitable navigation overlay by any suitable system in any suitable manner.

Figures 2A, 2B:
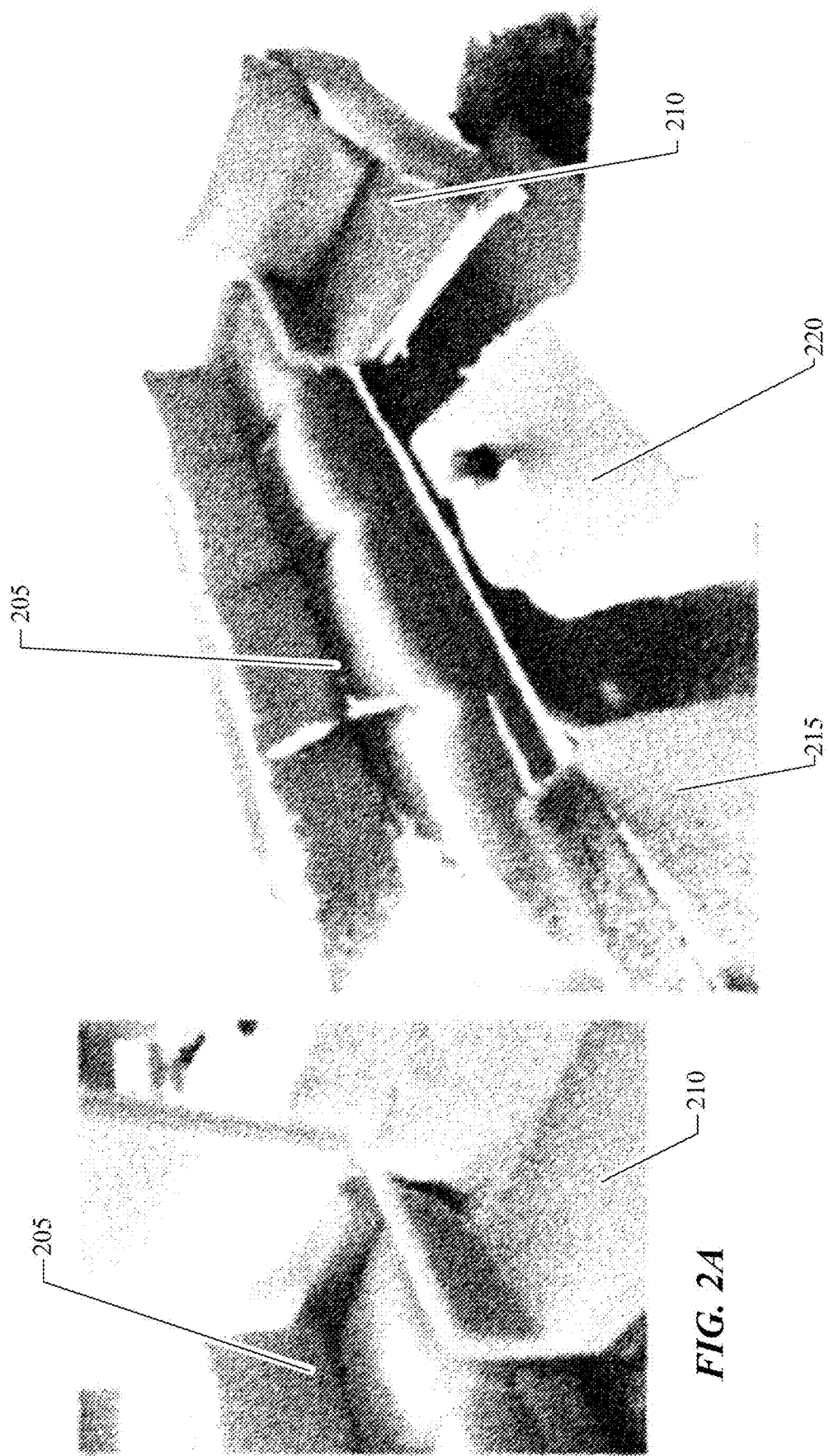
FIG. 2A illustrates an example view of an incomplete scene from a first user.
FIG. 2B illustrates an example view of a reconstructed scene from a second user

FIGS. 2A-2B illustrate an example use case for scene reconstruction from sparse sensor data. FIG. 2A illustrates an example view of an incomplete scene from a first user. As displayed in FIG. 2A, the incomplete scene may include only a small part of a couch 205 and a small part of a chair 210. FIG. 2B illustrates an example view of a reconstructed scene from a second user. As displayed in FIG. 2B, the reconstructed scene may include almost the complete couch 205, the complete chair 210, another chair 215, and a coffee table 220. Such scene reconstruction from sparse sensor data may enable users to share the sense of their surroundings. As an example and not by way of limitation, the first user associated with FIG. 2A may be a host who wants to invite guests for a watch party while all of them wear AR/VR headsets. The host may share his/her visual cognition of his/her living room with the guests so that they may feel like they are having the watch party all together at the host's living room. However, the host's view may only capture an incomplete scene of the living room. The embodiments disclosed herein may reconstruct the scene to make the view of a guest, i.e., the second user associated with FIG. 2B, more complete and realistic. Although this disclosure describes particular use cases of scene reconstruction by the embodiments disclosed herein in a particular manner, this disclosure contemplates any suitable use case of scene reconstruction by the embodiments disclosed herein in any suitable manner.

Figure 3:
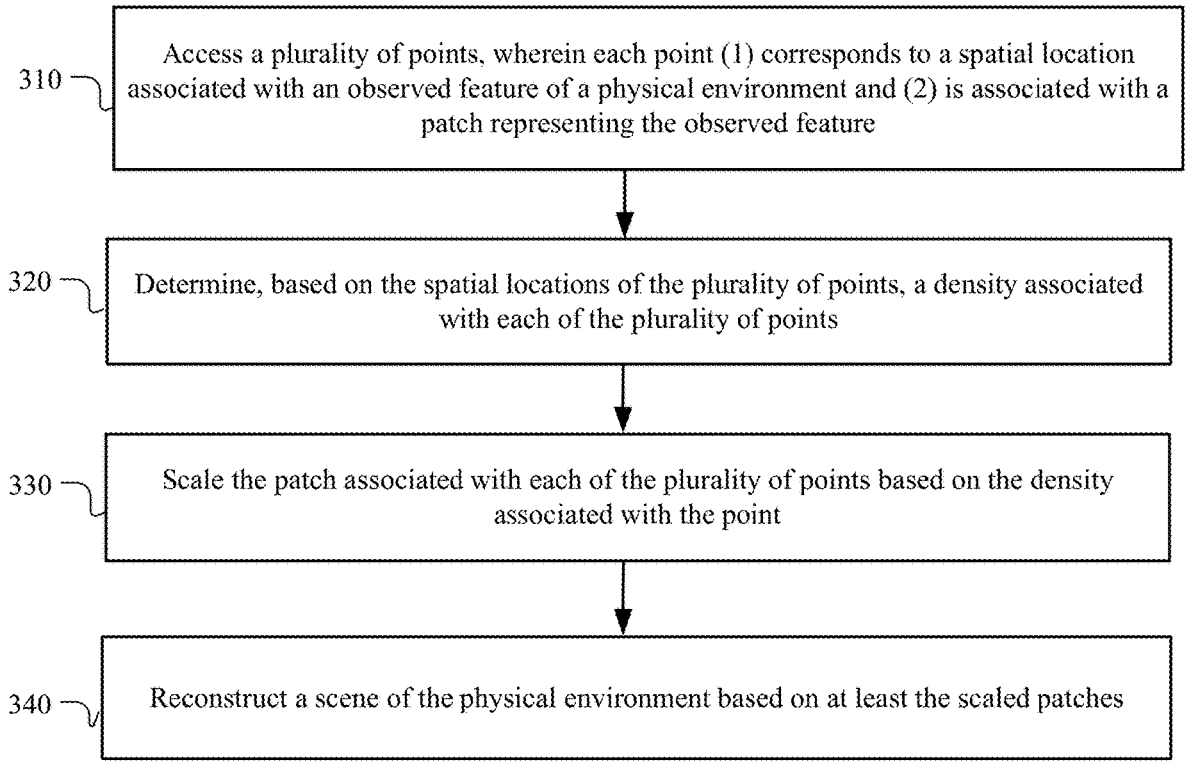
FIG. 3 illustrates an example method for reconstructing a scene from sparse sensor data.

FIG. 3 illustrates an example method 300 for reconstructing a scene from sparse sensor data. The method may begin at step 310, where the computing system may access a plurality of points, wherein each point (1) corresponds to a spatial location associated with an observed feature of a physical environment and (2) is associated with a patch representing the observed feature. At step 320, the computing system may determine, based on the spatial locations of the plurality of points, a density associated with each of the plurality of points. At step 330, the computing system may scale the patch associated with each of the plurality of points based on the density associated with the point. At step 340, the computing system may reconstruct a scene of the physical environment based on at least the scaled patches. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for reconstructing a scene from sparse sensor data including the particular steps of the method of FIG. 3, this disclosure contemplates any suitable method for reconstructing a scene from sparse sensor data including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Embodiments of the invention may include or be implemented in conjunction with an artificial reality system. Artificial reality is a form of reality that has been adjusted in some manner before presentation to a user, which may include, e.g., a virtual reality (VR), an augmented-reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 4:
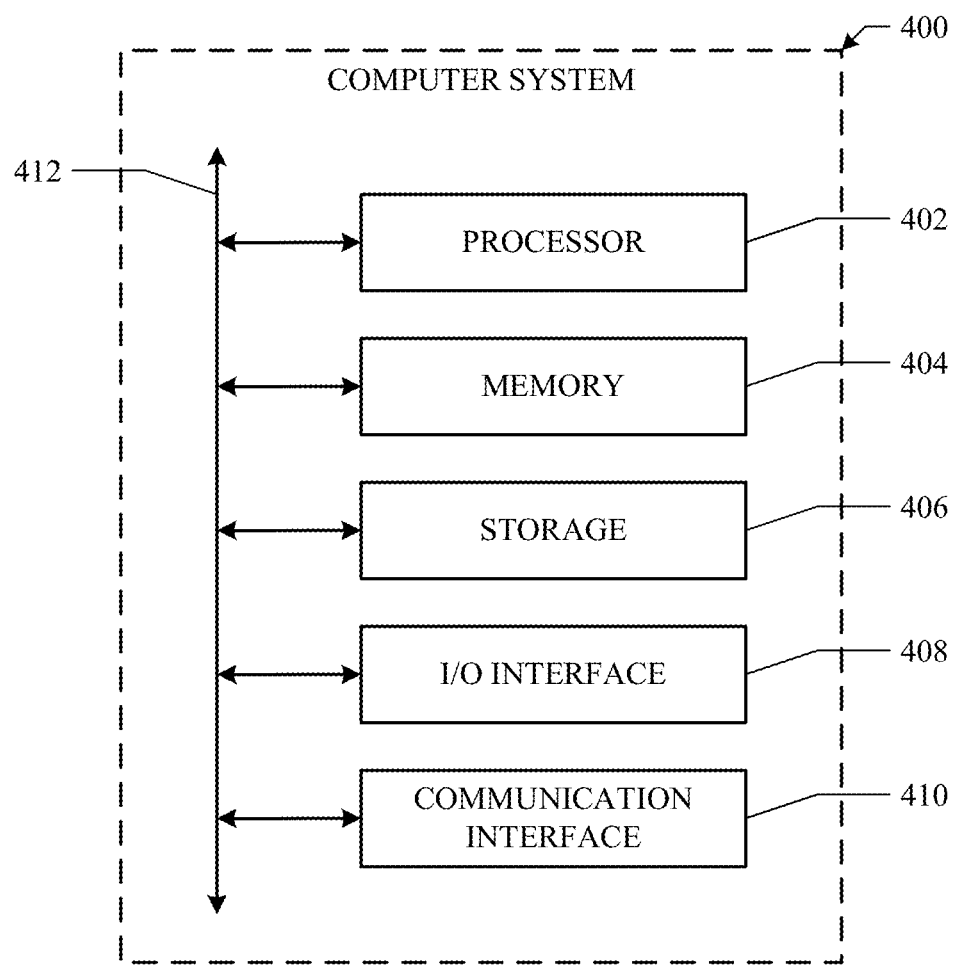
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    accessing a plurality of points, wherein each point (1) corresponds to a spatial location associated with an observed feature of a physical environment and (2) is represented by a patch, wherein each patch corresponds to a single point of the plurality of points;
    determining, based on the spatial locations of the plurality of points, a density associated with each of the plurality of points;
    adjusting a size of the patch associated with each of the plurality of points based on a multiplier determined based on the density associated with the point; and
    reconstructing a scene of the physical environment based on at least the size-adjusted patches.

2. The method of claim 1, further comprising:
    generating, based on the plurality of size-adjusted patches, a bounding box, wherein the bounding box comprises a plurality of uncolored cubes; and
    adding a blurred data color to each of the plurality of uncolored cubes based on a data color of a proximate size-adjusted patch, wherein the uncolored cube and the proximate size-adjusted patch have a proximity below a threshold value.

3. The method of claim 2, wherein reconstructing the scene of the physical environment is further based on the bounding box and the blurred data colors corresponding to the plurality of uncolored cubes.

4. The method of claim 2, wherein generating the bounding box is further based on a geometry shader.

5. The method of claim 2, further comprising identifying one or more boundaries associated with the bounding box based on one or more of:
    a viewing direction associated with the physical environment;
    a reduction of a geometry associated with the plurality of points; or
    an extrapolation of the geometry associated with the plurality of points.

6. The method of claim 5, further comprising:
    determining one or more background colors associated with the bounding box; and
    blending the one or more background colors with the one or more boundaries.

7. The method of claim 5, further comprising:
    identifying, for each boundary, one or more patches associated with the boundary; and
    randomly decimating the one or more patches with a gradient for each boundary.

8. The method of claim 5, further comprising:
    applying gradient mapping to the bounding box and the one or more boundaries.

9. The method of claim 5, further comprising:
    generating, for each of the boundaries, a color ramp; and
    applying patch animation to one or more patches associated with each of the boundaries.

10. The method of claim 1, wherein the plurality of points are generated based on one or more of an image or a video, wherein the generation comprises applying one or more aggregation algorithms to the one or more images or videos.

11. The method of claim 1, further comprising:
    determining, based on the plurality of points, a gradient background associated with the physical environment.

12. The method of claim 11, further comprising:
    adding one or more patches at random locations in the gradient background, wherein each of the added patches is of a random size.

13. The method of claim 1, wherein each patch is generated based on geometric approximation of the corresponding point.

14. The method of claim 1, wherein each patch is associated with one or more of a spatial location, a normal, or a color.

15. The method of claim 14, wherein each patch is associated with a normal, wherein the method further comprises determining the normal based on a depth map associated with the patch.

16. The method of claim 14, wherein each patch is associated with a normal, wherein the method further comprises determining the normal, wherein the determining comprises:
    identifying one or more areas of the patch, wherein each identified area is associated with a surface direction;
    aggregating the surface directions associated with the one or more areas; and
    determining the normal of the patch based on the aggregated surface directions.

17. The method of claim 1, further comprising:
    determining, based on one or more of size-adjusted patches, an expanded region;
    calculating a confidence score for the expanded region based on a probabilistic model;
    determining the calculated confidence score is below a threshold value; and
    sending, to a client device associated with the physical environment, instructions for requesting a user associated with the client device to visually scan a portion of the physical environment corresponding to the expanded region.

18. The method of claim 17, wherein reconstructing the scene is further based on the scan of the portion of the physical environment.

19. One or more computer-readable non-transitory storage media embodying software that is operable when executed to:
    access a plurality of points, wherein each point (1) corresponds to a spatial location associated with an observed feature of a physical environment and (2) is represented by a patch, wherein each patch corresponds to a single point of the plurality of points;
    determine, based on the spatial locations of the plurality of points, a density associated with each of the plurality of points;

adjust a size of the patch associated with each of the plurality of points based on a multiplier determined based on the density associated with the point; and reconstruct a scene of the physical environment based on at least the size-adjusted patches.

20. A system comprising: one or more processors; and a non-transitory memory coupled to the processors comprising instructions executable by the processors, the processors operable when executing the instructions to:

access a plurality of points, wherein each point (1) corresponds to a spatial location associated with an observed feature of a physical environment and (2) is represented by a patch, wherein each patch corresponds to a single point of the plurality of points;

determine, based on the spatial locations of the plurality of points, a density associated with each of the plurality of points;

adjust a size of the patch associated with each of the plurality of points based on a multiplier determined based on the density associated with the point; and reconstruct a scene of the physical environment based on at least the size-adjusted patches.

\* \* \* \* \*